March 14, 1967 R. A. BAUGHMAN 3,309,109
PROTECTIVE DEVICE
Filed Feb. 23, 1965 3 Sheets-Sheet 1
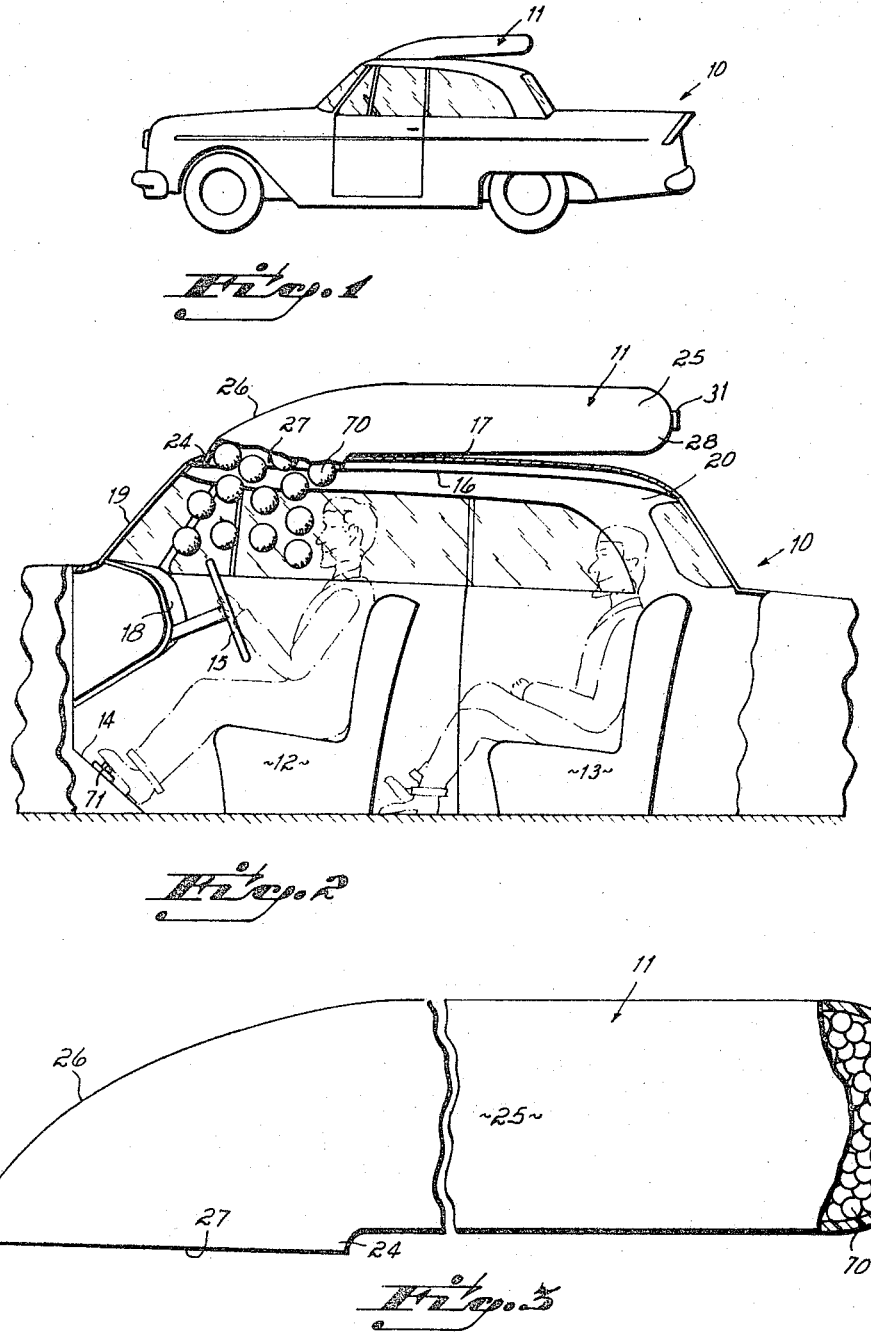
INVENTOR
Richard A. Baughman
BY
Wood, Herron & Evans
ATTORNEYS

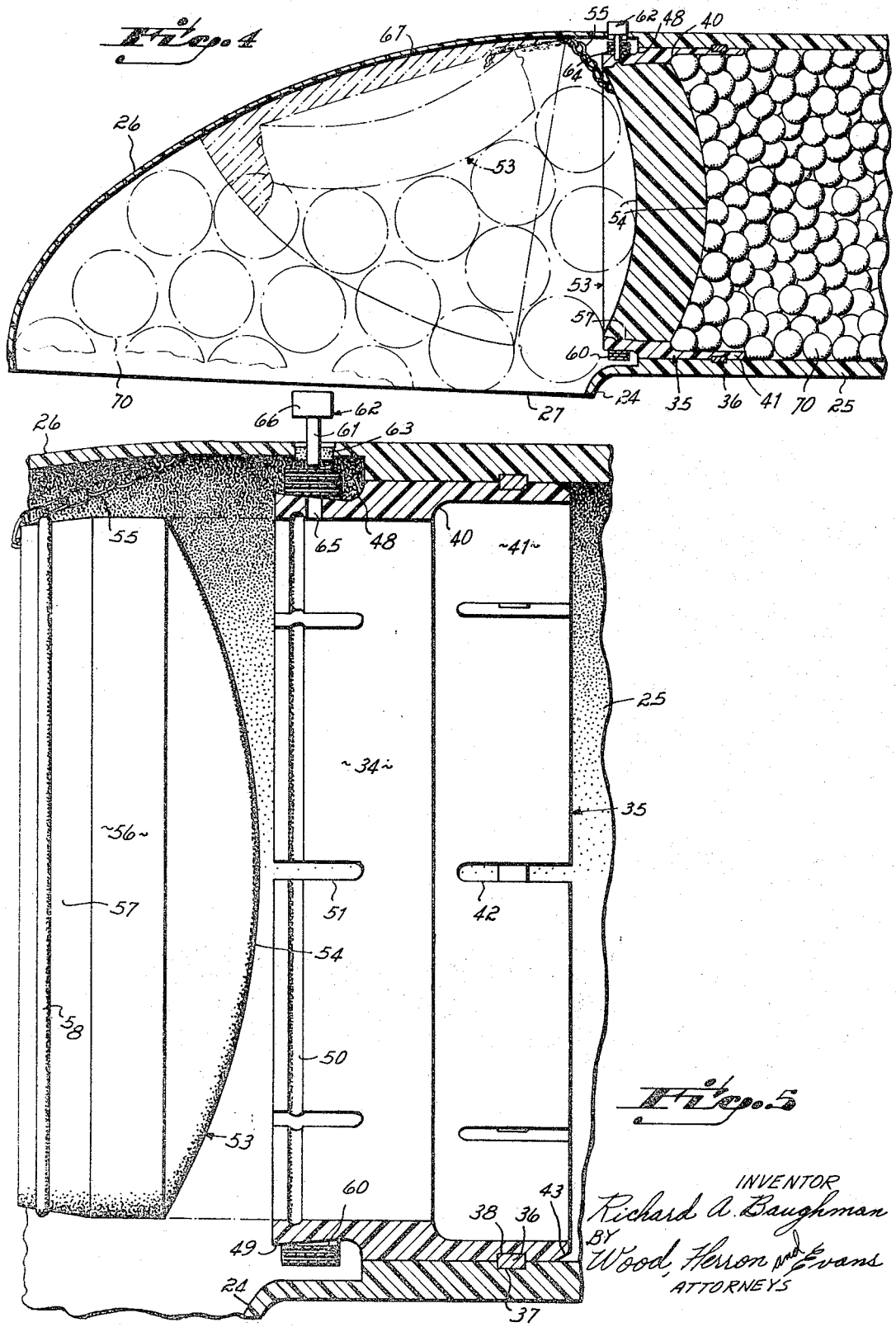

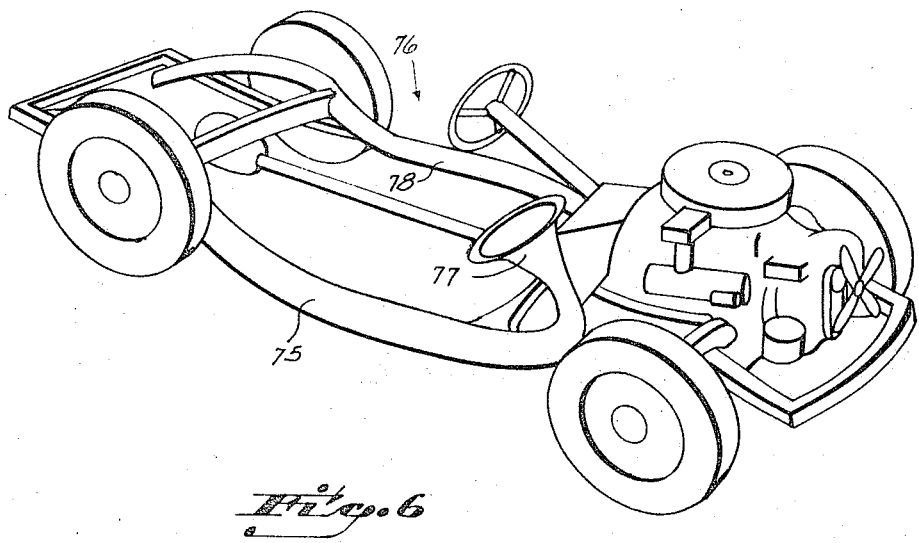

United States Patent Office 3,309,109
Patented Mar. 14, 1967

3,309,109
PROTECTIVE DEVICE
Richard A. Baughman, Cincinnati, Ohio
(2305 Kenwood Drive, Boulder, Colo. 80302)
Filed Feb. 23, 1965, Ser. No. 434,312
9 Claims. (Cl. 280—150)

This invention relates to means for cushioning objects against injury from sudden shock or impact. More particularly, the invention relates to means whereby the object to be protected is restrained and cushioned against decelerating forces of impact by a large plurality of resilient compressible elements which upon demand are discharged from a source such as a pressure container about the object to be protected. The safety device to which this invention is directed finds special utility, by way of example, for protecting passengers riding in a transportation vehicle against injury due to impact upon crash of the vehicle.

A sudden accelerating or decelerating force applied to an object over a large surface area thereon will tend to have a less severe effect and will tend to cause less damage than if the same force is concentrated on a small area of the object. The decelerating force is also reduced as the stopping distance is increased. Illustrative of these effects is the injury often caused in an automobile crash when the occupant strikes the dash; if the same decelerating force were applied over a larger area of his body, or if the stopping distance were increased, the incidence of damage would probably be much less.

It has been an objective of this invention to provide means for cushioning a movable object within a compartment against injury from sudden impact which will permit the object to remain freely movable within the compartment under ordinary circumstances, yet which can respond very rapidly in response to actuation by signal to discharge cushioning means about the object.

It has been another objective to provide a safety device providing cushioning means about a movable object in a compartment which is effective regardless of the shape or size of the object.

It has been a further objective to provide a protective device of the type described which is quicker acting in response to an actuating signal than previous cushioning safety devices.

According to a preferred embodiment of this invention there is provided a pressure vessel or container having a discharge port and a releasable closure sealed within the discharge port. Quick acting release means retain this closure in the discharge port, and can be actuated at will, for example in response to an electric signal, to rapidly free or open the closure or to permit it to open in response to pressure within the vessel. The pressure vessel has an interior compartment leading to the discharge port which contains a large plurality of discrete volumetrically compressible and expandable resilient elements which are compressed to relatively small volume in the vessel by a pneumatic fluid at high pressure therein, for release upon demand. When the closure is released the pressure fluid within the container discharges very rapidly through the release port, carrying the resilient elements through that port discharging them into a compartment or volume defined around the object to be protected. In discharge the resilient elements almost instantaneously expand to a larger volume, substantially filling the space around the object to be protected, restraining it against sudden impact against the walls of the compartment and decelerating it over a greater distance. In addition, the resilient elements, in filling the space, strengthen or rigidify the compartment within which the protected objects reside.

Retention of the volumetrically compressible elements within the pressure vessel under high pressure and at reduced volume is advantageous for two reasons: First of all, the volume at atmospheric pressure of the total number of elements required to fill a given space around the object to be protected is proportionately smaller as the pressure upon elements is increased; and secondly, pneumatic pressure within the container acts as a rapid discharge medium whereby upon opening of the discharge port the pressure fluid escapes rapidly carrying the resilient elements with it and very rapidly discharging them into the volume to be filled so that the rate of response of the protective device to opening of the discharge port is very rapid, and may be of the order of a few hundredths of a second.

The invention can best be further described by reference to the accompanying drawings in which:

FIG. 1 is a side elevation of a passenger automobile incorporating a protective device constructed in accordance with the principles of my invention, FIG. 2 is an enlarged fragmentary longitudinal cross section taken through the passenger compartment of the automobile shown in FIG. 1, and shows shock absorbing resilient balloons expanding and discharging into the compartment upon actuation by the driver of the protective device, FIG. 3 is an enlarged side elevation, partially in section, of the filled protective device, FIG. 4 is an enlarged cross section of the discharge end of the protective device, showing in dotted lines the expanded discharging balloons, FIG. 5 is an enlarged cross section of the discharge end with the plug removed from the sleve, and FIG. 6 is a perspective of the frame or chassis of an automobile wherein the container for the expandable elements is provided by a tubular frame member of the vehicle.

In FIGS. 1 and 2 a passenger automobile 10 is shown which is equipped with a protective device 11 in accordance with a preferred form of the invention. In automobile 10 the front seat is designated by 12, the rear seat by 13, the floor panels 14, steering wheel 15, a headliner 16, roof 17, dashboard 18, the windshield by 19, and the passenger compartment by 20.

The protective device 11 is suitably mounted externally to the roof 17 of the car, or at any convenient position whereat it can advantageously discharge its contents into the passenger compartment 20. As is shown subsequently, it can be combined as an integral structural frame member of the vehicle. This device 11 has as its principal component a container or pressure vessel comprising a cylinder or tube 25 which is capable of withstanding high internal pressures of the order of 400–1500 p.s.i. Tube 25 is suitably formed of wound glass fibers impregnated with an epoxy resin, so as to be as light as possible, or it may be made of steel. The forward or discharge end portion 26 of cylinder 25 curves to an opening 27. The cross sectional area of the opening 27 should be on the order of twice or more the cross sectional area of cylinder 25, and is defined within a neck portion 24 that extends through the roof 17 and headliner 16 of the car and opens into the passenger compartment 20. Neck 24 is rigidly mounted by suitable connecting means to the roof of the automobile.

The opposite or rear end 28 of cylinder 25 has a threaded opening or loading port 29 which receives a sealing plug 30. The diameter of this opening should be greater than that of the resilient elements in their compressed, high pressure, or unexpanded state, for reasons which will become apparent. A neck 31 projecting from the rear of the cylinder 25 is adapted to engage and seal to a pressurizing and loading chamber for filling the cylinder.

An annular sleeve or support ring 35 (see FIGS. 4 and 5) is fitted and sealed to cylinder 25 adjacent curved end portion 26. Internally this sleeve 35 defines a discharge port 34. A snap ring 36 seated in an annular recess or groove 37 formed in cylinder 25 engages an annular recess 38 of the sleeve, thereby positively locking the sleeve to the cylinder 25. In cross section sleeve 35 is stepped internally at 40, and a plurality of longitudinal slots 42 are cut into the rear section 41 of sleeve 35 extending toward step 40. An annular tapered or cam surface 43 is formed on the edge of this section 41 to facilitate mounting sleeve 35 in engagement with snap ring 36. If the cylinder 25 is made of steel, sleeve 35 can be welded to the cylinder, making the snap ring 36 and associated structure unnecessary.

Forward of shoulder 40 the outer circumference of sleeve 35 is stepped externally at 48 and has a surface 49 which in the unstressed condition flares outwardly. The internal wall of the sleeve at this portion 49 has an annular groove 50 formed therein, and a plurality of longitudinal slots 51 extending toward shoulder 48 divide the wall of the sleeve into segments.

A plug or discharge port closure 53 is releasably fitted into the outer end of sleeve 35, and may be loosely attached to the cylinder 25, as by a chain 55. This plug 53 preferably has spherically curved inner and outer surfaces 54 to withstand pressure in cylinder 25. The circumferential surface 56 of plug 53 just fits the internal diameter of port 34, and plug 53 also has an inwardly tapering surface 57 with an annular bead 58 formed thereon forward of surface 57.

Plug 53 is inserted into sleeve 35 so that bead 58 is in alignment with groove 50. A convolute spring 60, which may comprise a band of spring steel, is wound tightly around the outward flaring surface 49 of sleeve 35 to compress inwardly the segments between slots 51 and firmly lock the bead within the groove as the inner wall of the sleeve conforms to the tapered surface 57 of the plug; as shown in FIG. 4. It will be noted that the taper of surface 57 on the plug contributes, with bead 58 and groove 50, to holding the plug against outward movement under internal pressure in cylinder 25, and also forms a seal preventing loss of internal pressure. Additional seal forming means such as an O-ring may be provided on surface 56 to insure against loss of pressure.

The shank 61 of an explosively released lock pin 62 is inserted through aligned apertures 64 of the spring 60 and into an aperture or bore 65 in sleeve 35 to lock the spring tightly around the outer surface 49 of the sleeve and hold the end plug securely in place. A small explosive charge 63 beneath the head 66 of this pin 62 can be fired by an electric signal to blow the pin from the spring. Spring 60 will thereupon uncoil and expand very rapidly, freeing end plug 53 and permitting the balloons under pressure within cylinder 25 to expand and discharge through port 34 and neck 24 into compartment 20 of the vehicle. As shown in broken lines in FIG. 4, a foam cushion 67 may be mounted to the inner wall of the end portion 26 of cylinder 25 to cushion plug 53 when it is released from port 34.

The internal chamber defined within cylinder 25 and closed at its forward end by plug 53 constitutes a pressure chamber and contains a large plurality of inflated but highly compressed resilient volumetrically expandable members 70. For purposes of explanation these members 70 are primarily referred to herein as balloons, but they may constitute expansible resilient foams, balls or any device which may be resiliently compressed to a fraction of the volume which it occupies at atmospheric pressure or to which it will upon release of the pressure expand very rapidly, and which is adapted to cushion impact. I prefer that these members 70 constitute pre-inflated rubber or plastic balloons. The volume which they will occupy under high pressure within tube 25 can be approximately expressed by the relation $P_1V_1 = P_2P_2$ wherein the subscript 1 refers to conditions within cylinder 25 and wherein subscript 2 refers to conditions upon discharge. For example, balloons which occupy a volume of one cubic inch at 15 p.s.i. will occupy a volume of about 0.01 cubic inch at 1500 pounds p.s.i. When compressed by pressure fluid in cylinder 25, the balloons and fluid possess potential energy which, when the end cap is released expands the balloons and carries or ejects them into the passenger compartment, as shown in FIG. 1, between the occupants and surfaces such as the dashboard, seats and windshield against which they might be thrown by the force of the crash.

The safety device of this invention is much quicker acting upon actuation than those devices wherein a collapsed bag is provided which must be inflated from a separate source of pressure upon actuation, as shown in U.S. Patent No. 2,834,606. Moreover, the small, discrete, pre-inflated balloons used according to this invention readily conform to the volume and shape of any compartment area into which they are released, in contrast to the devices of the inflatable bag type wherein the bag inherently tends to expand to a shape having the smallest surface area for its volume.

It is contemplated that the safety device of this invention can be actuated upon demand by the occupant or driver of the car, for example by depressing an electrical switch 71 which may be mounted on the floorboard or dashboard of the automobile and which is connected through the electrical system of the car to fire the explosive charge 63 which releases the retaining pin 61. Other electric or mechanical actuating means could be used however; for example, a shock responsive electrical switch which is actuated by deceleration forces greater than a certain magnitude, or a pressure operated switch mounted to the bumper or fenders of the automobile. It will be appreicated that various forms of switch or other means for releasing pin 61 may be used depending upon the type of installation in which the protection device is to be used.

Cylinder 25 is suitably loaded with the resilient balloons 70 by connecting shoulder 31 to a pressurizable chamber (not shown). The rubber balloons or other elastically compressible resilient members 70 are loaded into the pressurized chamber and the chamber and the members 70 therein are placed under pressure equal to the desired final pressure within cylinder 25. As the pressure increases the volume of the individual members decreases, enabling them to pass or drop through the aperture 29 into the cylinder 25. When the cylinder 25 is filled, plug 30 is inserted into port 29 and locked thereto while pressure within the cylinder is maintained. The protective device 11 is then ready for use.

In the above described embodiment the container in which the expandable members 70 are contained is mounted to the roof of the automobile. Such structure is particularly useful where the protective device of this invention is to be fitted to existing vehicles. In FIGURE 6 there is shown an alternative embodiment wherein the container for the volumetrically expandable elements comprises a closed, hollow box-like or tubular structural frame member 75 of the chassis 76 of the vehicle. This container 75 has a bell-shaped discharge end or port 77 which opens into the body compartment of the car, for example, below or through the dashboard. This embodiment permits the pressure container to be integrated with the structural frame of the vehicle, thereby eliminating the need for a separate pressure container. The frame member 75 presents a closed internal chamber which may be fitted with a releasable plug similar to plug 53 shown in FIGS. 4 and 5, and which also may be fitted with plug release mechanism for example of the type shown. A second or opposite frame member 78 may comprise an additional container for expandable elements 70, in order to accommodate a larger volume of compressible elements While the protective device of this invention is shown in the drawings and described herein primarily as mounted to an automobile, it should be noted that its utility is not limited to such use, but that it may, for example, be used in other conveyances such as train cars, buses, aircraft, ships, or any compartment subject to impact to protect occupants or equipment or objects therein from impact.

Having described my invention, I claim:

1. Means for restraining matter movably disposed within a compartment against sudden impact comprising, a vessel adapted to withstand internal pressure and having a discharge port, a releasable closure sealingly fitted to said vessel to close said discharge port, release means engaging said releasable closure and restraining said closure against pressure exerted thereon from within said vessel, means for actuating said release means to release said closure substantially entirely upon actuation thereof, thereby opening said port, and a large plurality of free volumetrically compressible resilient elements within said vessel, said elements having a total volume at atmospheric pressure conditions which is many times the internal volume of said vessel but being compressed by gas pressure within said vessel to conform to the volume of said vessel, the said elements being of a size and shape permitting them to move freely through said port when said closure is released therefrom, the compression of said gas and said elements within said vessel being sufficient that upon release of said closure said elements are expelled from said vessel.

2. The means of claim 1 wherein said volumetrically expandable elements comprise pre-inflated balloons compressed in said vessel by pneumatic pressure therein substantially higher than pressure external to said vessel.

3. Safety means for protecting objects in a vehicle from damage due to sudden impact thereon, comprising a pressure container adapted to withstand high internal pressures, said pressure container having a discharge port, a releasable closure sealingly residing within said port, closure retaining means including a groove and bead formed between said discharge port and closure positively retaining said closure within said port against internal pressure in said vessel, means for releasing said closure retaining means, a large plurality of volumetrically expansible free resilient elements disposed within said pressure vessel and retained therein under pneumatic pressure within said vessel, the volume of said elements under said pressure in said vessel being a fraction of a volume to which said elements would expand at atmospheric pressure, and means for mounting said safety means to said vehicle and directing elements discharged from said container through said port into the interior of said vehicle upon the release of said closure.

4. An impact protective device comprising, a hollow vessel having an opening at one end, means presenting a plurality of longitudinally extending radially distendable spring fingers around the periphery of said opening, a plug adapted to seat within said opening, an annular spring disposed circumferentially around said fingers for holding said fingers radially inward in engagement with said plug, selectively actuable means for releasing said spring from said fingers thereby permitting said fingers to expand radially and disengage said plug, and a large plurality of free volumetrically expandable elements within said vessel, each said element being maintained by pressure within said vessel at a volume which is substantially smaller than the volume to which said element will expand upon release of said pressure, each said element being passable through said opening when said plug is released therefrom, release of said plug permitting said elements to expand and discharge themselves from said vessel through said opening.

5. In combination, a conveyance having a compartment in which matter is transported and an impact protective device for protecting matter in said compartment against impact with a wall of said compartment, said device comprising, a pressure container adapted to withsand superatmospheric internal pressures, said pressure container having a discharge port, a releasable closure closing said port, closure retaining means retaining said closure within said port against internal pressure in said vessel, means for releasing said closure retaining means, a large plurality of volumetrically expansible free resilient elements disposed within said pressure vessel and retained therein under pneumatic pressure within said vessel, the volume of said elements under said pressure in said vessel being a fraction of a volume to which said elements will expand upon release of said pressure, and means mounting said protective device to said conveyance including a passage for directing said elements upon discharge from said container through said port into the compartment of said conveyance between said matter and said wall.

6. The combination of claim 5 wherein the releasing means is electrically actuated and includes a pressure actuated switch mounted to an external surface of said conveyance.

7. The combination of claim 5 wherein said pressure container comprises a structural frame member of said conveyance.

8. An impact protective device comprising, a hollow cylindrical vessel having an opening at one end, an annular ring fastened to said vessel within said opening, said ring having a plurality of longitudinally extending slots defining between them radially distendable spring fingers, a plug seated within ring in said opening, an annular spring band wrapped around said fingers and holding said fingers radially inward in engagement with said plug, a pin extending through said spring holding it wrapped around said fingers, selectively actuable means for disengaging said pin from said spring and thereby releasing said spring from said fingers, and a large plurality of free volumetrically expandable elements within said vessel, each said elements being compressed by pressure within said vessel to a relatively small volume in comparison to the volume of said element at atmospheric pressure, said elements being passable through said opening when said plug is released therefrom, release of said plug permitting said elements to expand and discharge themselves from said vessel through said opening.

9. The device of claim 8 wherein said selectively actuable means includes an explosive charge for disengaging said pin from said spring and an electric circuit for firing said charge.

References Cited by the Examiner

UNITED STATES PATENTS

| | | | |
|---|---|---|---|
| 1,675,957 | 7/1928 | Reeves | 280—150 X |
| 2,834,606 | 5/1958 | Bertrand | 280—150 |
| 2,834,609 | 5/1958 | Bertrand | 280—150 |
| 3,197,234 | 7/1965 | Bertrand | 280—150 |
| 3,243,822 | 4/1966 | Lipkin | 280—150 X |

FOREIGN PATENTS

| | | |
|---|---|---|
| 22,852 | 10/1930 | Australia. |
| 395,495 | 7/1933 | Great Britain. |

BENJAMIN HERSH, *Primary Examiner.*

M. S. SALES, L. D. MORRIS, *Assistant Examiners.*